United States Patent
Cho et al.

(10) Patent No.: US 9,996,084 B2
(45) Date of Patent: Jun. 12, 2018

(54) SYSTEM AND METHOD OF CONTROLLING VISION DEVICE FOR TRACKING TARGET BASED ON MOTION COMMANDS

(75) Inventors: Dong-il Cho, Seoul (KR); Jaehong Park, Seoul (KR)

(73) Assignee: SNU R&DB FOUNDATION, Seoul (KR)

( * ) Notice: Subject to any disclaimer, the term of this patent is extended or adjusted under 35 U.S.C. 154(b) by 429 days.

(21) Appl. No.: 13/319,608

(22) PCT Filed: Feb. 23, 2011

(86) PCT No.: PCT/KR2011/001190
§ 371 (c)(1),
(2), (4) Date: Nov. 9, 2011

(87) PCT Pub. No.: WO2012/018168
PCT Pub. Date: Feb. 9, 2012

(65) Prior Publication Data
US 2012/0212623 A1    Aug. 23, 2012

(30) Foreign Application Priority Data

Aug. 5, 2010 (KR) .................. 10-2010-0075515

(51) Int. Cl.
*H04N 5/225* (2006.01)
*G05D 1/02* (2006.01)

(52) U.S. Cl.
CPC ................... *G05D 1/0246* (2013.01)

(58) Field of Classification Search
CPC ............ H04N 5/225; G05D 1/00; G05B 19/04
(Continued)

(56) References Cited

U.S. PATENT DOCUMENTS

| | | | |
|---|---|---|---|
| 6,734,914 B1* | 5/2004 | Nishimura | H04N 5/2251 348/207.99 |
| 2002/0013641 A1* | 1/2002 | Nourbakhsh | G05D 1/0214 700/245 |

(Continued)

FOREIGN PATENT DOCUMENTS

| | | |
|---|---|---|
| JP | 09-149309 A | 6/1997 |
| KR | 10-2009-0043461 A | 5/2009 |

(Continued)

OTHER PUBLICATIONS

Tomohiro Shibata, et al, "Biomimetic Oculomotor Control", International Society for Adaptive Behavior, 2001, vol. 9(3-4), pp. 189-207.

(Continued)

*Primary Examiner* — Deirdre Beasley
(74) *Attorney, Agent, or Firm* — McDermott Will & Emery LLP

(57) ABSTRACT

A system of controlling a vision device based on motion commands may include: a movable body; a vision device driven by being connected to the body and receiving image information; a driving unit driving the body in accordance with a motion command; and a control unit which calculates motion information of the body using the motion command and drives the vision device so as to compensate an influence caused by the motion of the body using the calculated motion information. By using the system, reliable image information may be obtained in a manner such that a vision device included in a subject such as a locomobile robot is controlled to watch a predetermined target even when the subject moves.

10 Claims, 7 Drawing Sheets

(58) Field of Classification Search
USPC .......................... 348/169; 700/253; 382/153
See application file for complete search history.

(56) References Cited

U.S. PATENT DOCUMENTS

| | | | |
|---|---|---|---|
| 2004/0066952 A1* | 4/2004 | Hasegawa | G06K 9/6255 382/103 |
| 2004/0249504 A1* | 12/2004 | Gutmann | G05D 1/0231 700/245 |
| 2005/0200325 A1* | 9/2005 | Kim | G08C 23/04 318/568.12 |
| 2005/0222713 A1* | 10/2005 | Kawabe | B25J 19/021 700/259 |
| 2005/0256611 A1* | 11/2005 | Pretlove | B25J 9/1664 700/264 |
| 2006/0106496 A1* | 5/2006 | Okamoto | G05D 1/0272 700/253 |
| 2006/0271238 A1* | 11/2006 | Choi | B25J 9/1689 700/245 |
| 2007/0150106 A1* | 6/2007 | Hashimoto | G06N 3/004 700/245 |
| 2007/0198129 A1* | 8/2007 | Koselka | B25J 5/007 700/245 |
| 2007/0282531 A1* | 12/2007 | Park | G05D 1/0253 701/301 |
| 2008/0055413 A1* | 3/2008 | Hayashi | H04N 5/232 348/169 |
| 2008/0085048 A1* | 4/2008 | Venetsky | G06K 9/00355 382/153 |
| 2008/0129829 A1* | 6/2008 | Shin | H04N 5/23248 348/208.1 |
| 2008/0316368 A1* | 12/2008 | Fritsch | H04N 5/23203 348/722 |
| 2009/0213219 A1* | 8/2009 | Eggert | G06T 7/285 348/148 |
| 2010/0152897 A1* | 6/2010 | Muller | B25J 19/023 700/259 |
| 2011/0172822 A1* | 7/2011 | Ziegler | B25J 5/007 700/259 |

FOREIGN PATENT DOCUMENTS

| | | |
|---|---|---|
| KR | 10-2009-0074410 A | 7/2009 |
| KR | 10-2010-0071150 A | 6/2010 |

OTHER PUBLICATIONS

L. Kerhuel, et al, "A sighted Aerial Robot with Fast Gaze and Heading Stabilization", Proceedings of the 2007 IEEE/RSJ International Conference on Intelligent Robots and Systems San Diego, CA, USA, Oct. 29-Nov. 2, 2007, pp. 2634-2641.

Jorge Lobo, et al, "Inertial Sensed Ego-motion for 3D Vision", Journal of Robotic Systems 21(1), 2004, pp. 3-12.

Xiaolin Zhang, et al, "An Object Tracking System Based on Human Neural Pathways of Binocular Motor System", ICARCV, 2006.

Xiaolin Zhang, et al, "A Robot-Eye Control System Based on Binocular Motor Mechanism",SICE, 15th Symposium on Biological and Physiological Engineering, 2000, pp. 1-8.

F. Panerai, et al, "Visuo-intertial Stabilization in Space-variant Binocular Systems", Robotics and Autonomous Systems 30(2000), pp. 195-214.

A. Lenz, et al, "An Adaptive Gaze Stabilization Controller inspired by the Vestibulo-ocular Reflex", Bioinsp. Biomim. 3 (2008), 035001, pp. 1-11.

Peter Corke, et al, "An Introduction to Inertial and Visual Sensing", The International Journal of Robotics Research vol. 26, No. 6, Jun. 2007, pp. 519-535.

Shaorong Xie, et al, "Biomimetic Control of Pan-tilt-zoom Camera for Visual Tracking Based-on an Automous Helicopter", Proceedings of the 2007 IEEE/RSJ International Conference on Intelligent Robots and Systems San Diego, CA, USA, Oct. 29-Nov. 2, 2007, pp. 2138-2143.

* cited by examiner

【Figure 1】
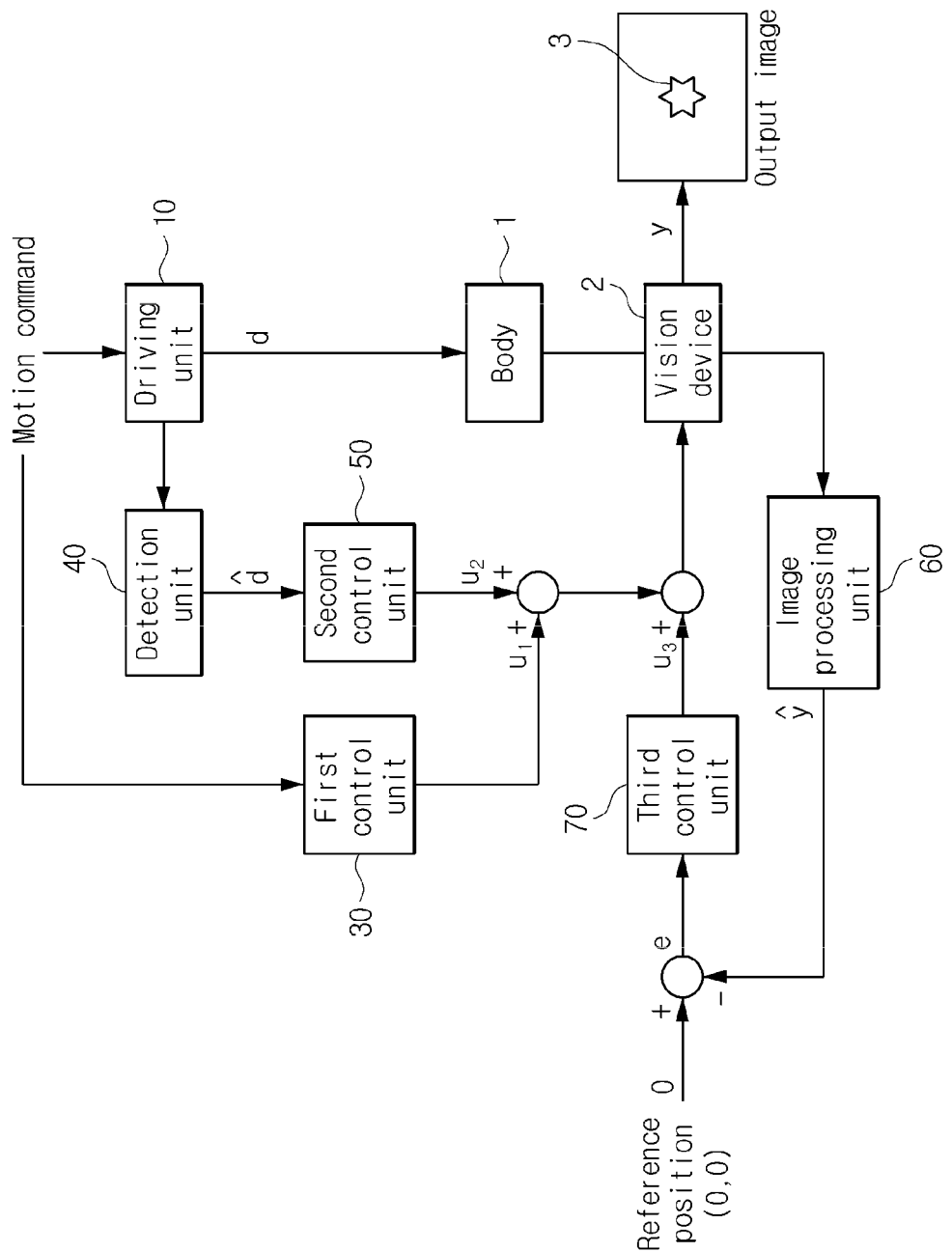

【Figure 2】
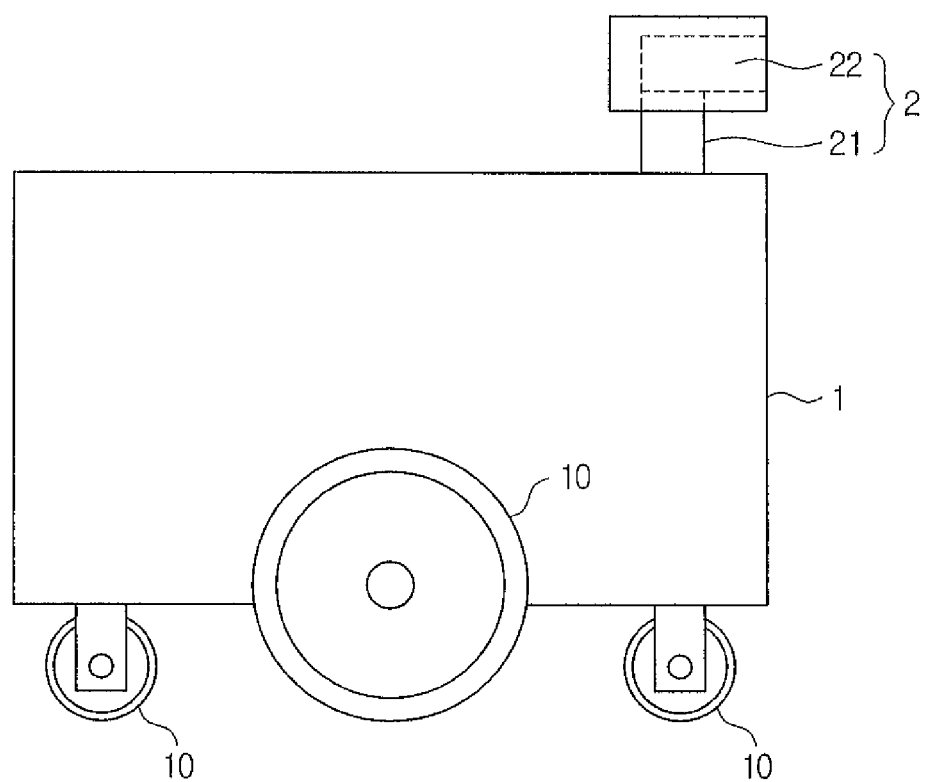

【Figure 3】
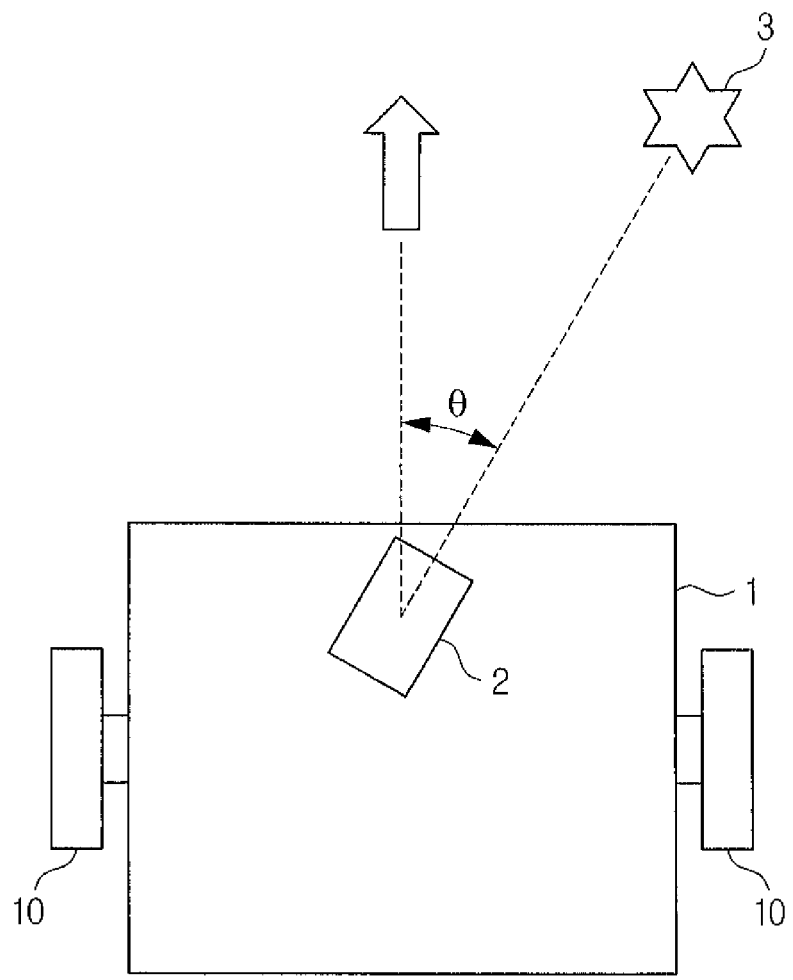

[Figure 4]
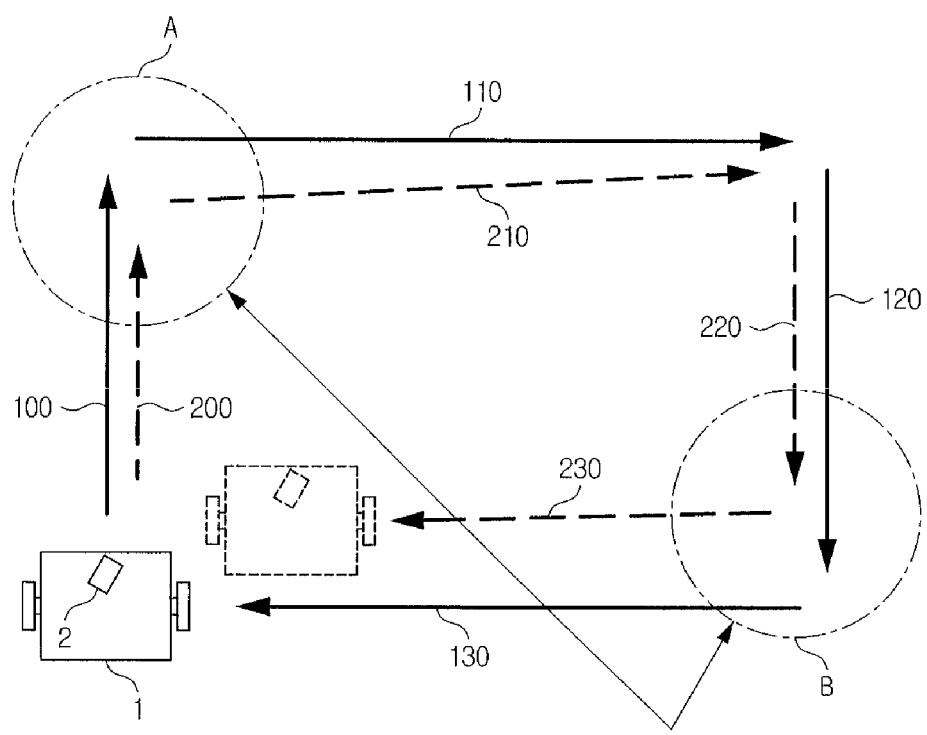

【Figure 5】
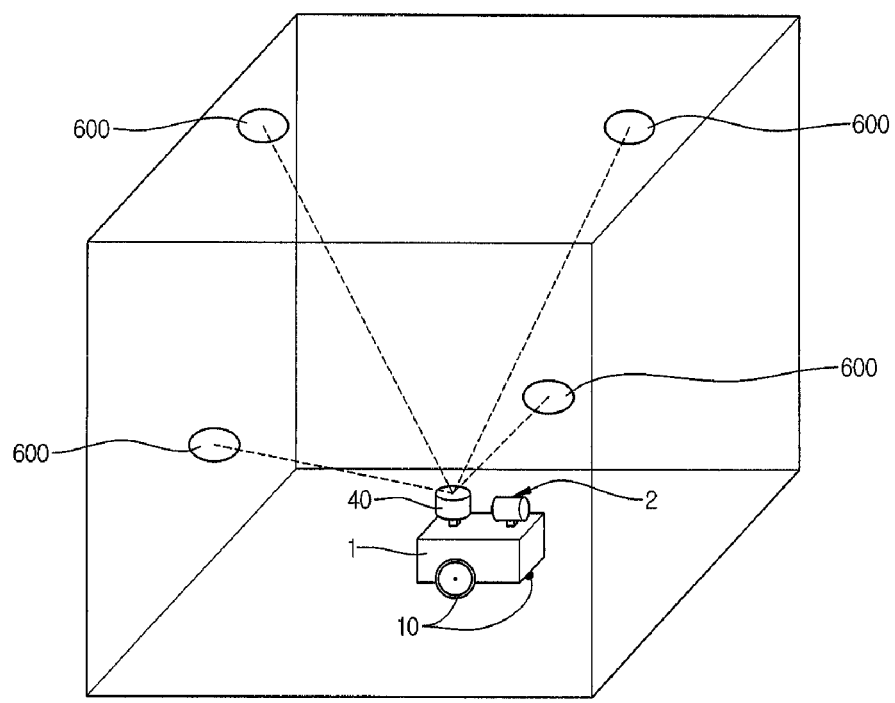

[Figure 6]
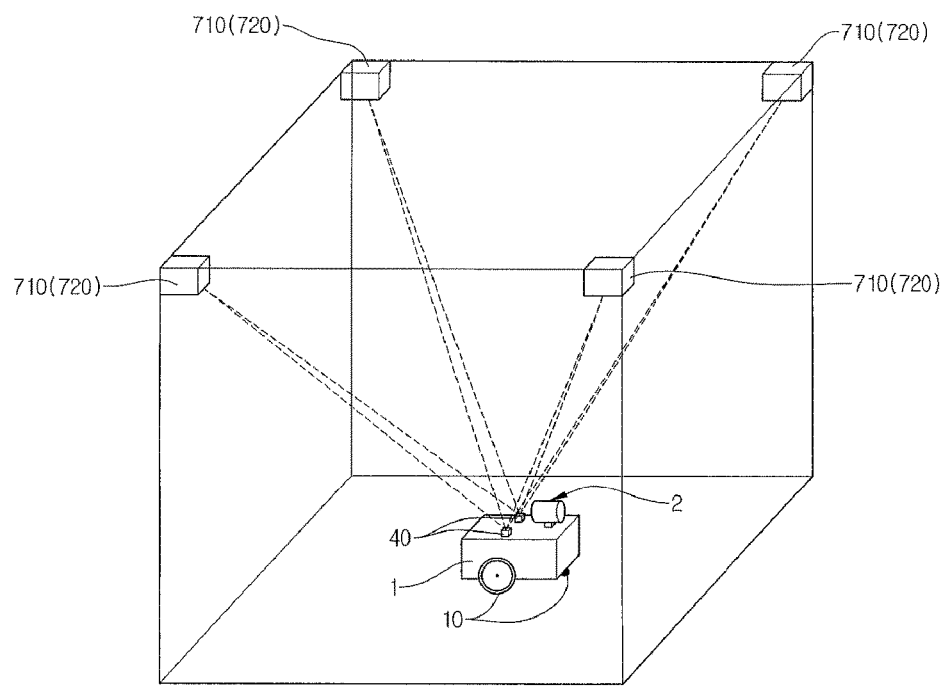

[Figure 7]
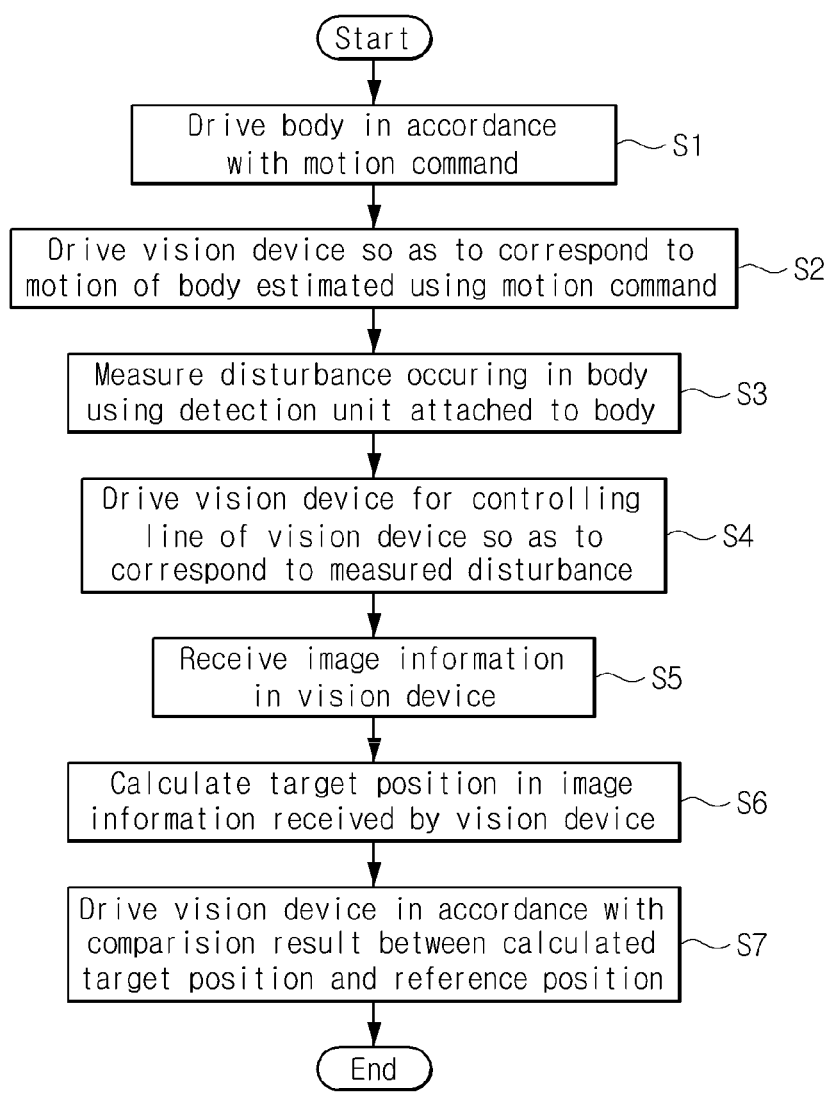

SYSTEM AND METHOD OF CONTROLLING VISION DEVICE FOR TRACKING TARGET BASED ON MOTION COMMANDS

RELATED APPLICATIONS

This application is the U.S. National Phase under 35 U.S.C. § 371 of International Application No. PCT/KR2011/001190, filed on Feb. 23, 2011, which in turn claims the benefit of Korean Patent Application No. 10-2010-0075515, filed on Aug. 5, 2010, the disclosures of which Applications are incorporated by reference herein.

TECHNICAL FIELD

The present disclosure relates to a system and a method of controlling a vision device for tracking a target based on motion commands. Specifically, the disclosure relates to a system and a method of controlling a vision device based on motion commands capable of controlling a motion of a vision device so that a line of sight of the vision device attached to a locomobile robot is fixed to a recognition target using motion commands or motion commands and motion information detected by the locomobile robot.

BACKGROUND ART

A locomobile robot has been widely used for carrying out tasks such as a monitoring security service. In order that the locomobile robot carries out such tasks, there is an essential demand for a function of moving the robot and changing the direction thereof using a traveling unit thereof. Furthermore, in the locomobile robot, it is one of core functions to implement a vision system that acquires external image signals so as to carry out a function of recognizing or tracking a specific object.

However, since the traveling unit and the vision system of the locomobile robot are connected to the same body, there is a problem in that a target to be recognized by the vision system is deviated from the input range of the vision system when the traveling unit of the robot rotates or the vision system installation portion rotates. Furthermore, even when the target is not deviated from the input range, a phenomenon such as blurring occurs in image signals acquired by the vision system, which causes a problem in that an object recognition rate and an accuracy of the vision system is degraded.

DISCLOSURE

Technical Problem

The present disclosure is directed to providing a system and a method of controlling a vision device for tracking a target based on motion commands capable of controlling a direction of a line of sight of a vision device so that the vision device included in a subject such as a locomobile robot watches a recognition target even when the subject moves by using motion commands or motion commands and motion information detected by a sensor attached to the subject.

Technical Solution

In one aspect, there is provided a system of controlling a vision device based on motion commands including: a movable body; a vision device driven by being connected to the body and receiving image information; a driving unit driving the body in accordance with a motion command; and a first control unit which calculates motion information of the body using the motion command and drives the vision device so as to compensate an influence caused by the motion of the body using the calculated motion information and fix a direction of a line of sight of the vision device to a target.

Furthermore, the system of controlling the vision device based on motion commands may further include: a detection unit attached to the body and measuring disturbance generated in the body; and a second control unit which drives the vision device so as to compensate an influence caused by the disturbance measured in the detection unit.

Furthermore, the system of controlling the vision device based on motion commands may further include: an image processing unit which calculates a position of a predetermined target in the image information received by the vision device; and a third control unit which drives the vision device in accordance with a comparison result between a predetermined reference position and a target position calculated by the image processing unit.

Moreover, at least one of the first control unit to the third control unit may be configured to move the vision device, rotate the vision device, or move and rotate the vision device. Furthermore, at least one of the first control unit to the third control unit may be configured to adjust a zoom level of a camera included in the vision device.

In another aspect, there is provided a method of controlling a vision device based on motion commands including: providing a movable body and a vision device driven by being connected to the body and receiving image information; driving the body in accordance with a motion command; calculating motion information of the body using the motion command; and driving the vision device so as to compensate an influence caused by the motion of the body using the motion information.

Advantageous Effects

By adopting the system and the method of controlling the vision device based on motion commands according to an aspect, the motion information of the locomobile robot may be recognized by using a motion command for driving the locomobile robot or using a detection result obtained from various sensors in addition to the motion command. Then, the motion of the vision device is controlled so that the line of sight of the vision device of the locomobile robot is fixed to the target on the basis of the obtained motion information. As a result, the direction of the line of sight of the vision device may be maintained to be constantly directed to the recognition target even when the locomobile robot continuously moves linearly and/or rotates. That is, the recognition target may be made to be continuously positioned at the center of the output image frame of the vision device.

Accordingly, since the vision device watches the recognition target even when the locomobile robot continuously moves for a long period of time, a deviation of the target from the recognition range of the vision device may be prevented, and a phenomenon such as blurring may be prevented from occurring in an image even when the target is not deviated from the recognition range. Accordingly, reliable image information may be obtained even when the locomobile robot moves, so that the recognition rate and the tracking success rate of the vision device may improve. Further, motion information estimated from motion commands is compared with motion information actually detected from various sensors, and thus, disturbance such as slip or collision which may be generated in travelling may be detected and an error caused by disturbance may be corrected.

DESCRIPTION OF DRAWINGS

FIG. 1 is a block diagram illustrating a configuration of a system of controlling a vision device based on motion commands according to an embodiment;

FIG. 2 is a schematic diagram illustrating a subject adopting a system of controlling a vision device based on motion commands according to an embodiment;

FIG. 3 is a schematic plan view illustrating a state where a direction of a line of sight of a vision device rotates when a subject moves in a system of controlling a vision device based on motion commands according to an embodiment;

FIG. 4 is a plan view exemplarily illustrating movement paths when a sliding phenomenon occurs in a subject adopting a system of controlling a vision device based on motion commands and when a sliding phenomena does not occur;

FIG. 5 is a schematic diagram illustrating a subject adopting a system of controlling a vision device based on motion commands using a landmark device as a detection unit according to an embodiment;

FIG. 6 is a schematic diagram illustrating a subject adopting a system of controlling a vision device based on motion commands using an indoor Global Positioning System (GPS) device as a detection unit according to an embodiment; and FIG. 7 is a flowchart illustrating a method of controlling a vision device based on motion commands according to an embodiment.

MODE FOR INVENTION

Exemplary embodiments now will be described more fully hereinafter with reference to the accompanying drawings.

FIG. 1 is a block diagram illustrating a configuration of a system of controlling a vision device based on motion commands according to an embodiment.

Referring to FIG. 1, a system of controlling a vision device based on motion commands may include a movable body 1, a vision device 2 connected to the body 1 and receiving image information, a driving unit 10 driving the body 1, and a first control unit 30 controlling the vision device 2 by a feedforward control. In an embodiment, the system of controlling the vision device based on motion commands may further include a detection unit 40 and a second control unit 50 which are used to detect disturbance generated in the body 1 and control the vision device 2 by a feedforward control. Furthermore, in an embodiment, the system of controlling the vision device based on motion commands may further include an image processing unit 60 and a third control unit 70 which are used to control the vision device 2 by using the image information received from the vision device 2 as a feedback signal. The specific configuration of each unit will be described later in detail.

In this disclosure, terms such as a unit, a device, and a system may indicate a computer-related entity such as hardware, a combination of hardware and software, and software. For example, a unit, a device, or a system described in this disclosure may include an executed process, a processor, an object, an executable file, a thread of execution, a program, and/or a computer, without limiting thereto. For example, both hardware configured to perform a specific function and software such as application for operating the hardware may correspond to a unit, a device, and a system of this disclosure.

FIG. 2 is a schematic diagram illustrating a subject adopting a system of controlling a vision device based on motion commands according to an embodiment.

Referring to FIG. 2, the system of controlling the vision device based on motion commands according to an embodiment may be applied to a subject including the body 1 and the vision device 2 connected to each other. The subject is a subject, for example, a locomobile robot that may be linearly movable and/or rotatable through automatic and manual operations. For example, the body 1 may be a portion such as a body or a leg used for the attachment of a device involving with a traveling operation of the locomobile robot, and the vision device 2 may be a portion such as a head or an eye used for the attachment of a vision sensor of the locomobile robot. Each of the body 1 and the vision device 2 does not essentially indicate one integrated portion, but may include a plurality of portions physically connected to each other and/or connected to each other through communication.

In embodiments described in this disclosure, an application example in which the system of controlling the vision device based on motion commands is applied to the locomobile robot will be described for convenience of description, but the spirit of the invention is not limited thereto.

The "drive" in this disclosure is intended to indicate a motion including any one of or both a linear movement and a rotation. For example, the driving of the body 1 may include an operation in which the locomobile robot travels in a constant direction, an operation in which the body rotates while the position of the locomobile robot is fixed at the current position, and an operation in which the locomobile robot moves along a curve by changing a direction thereof in a traveling mode. Furthermore, in a similar manner, the driving of the vision device 2 may include an operation in which the position of the vision device 2 is moved along one direction, an operation in which only the direction of the line of sight is rotated while the position of the vision device 2 is fixed, an operation in which the direction is rotated while moving the position of the vision device 2, and the like.

Hereinafter, referring to FIGS. 1 and 2, an operation of the system of controlling the vision device based on motion commands according to an embodiment will be described.

The locomobile robot including the body 1 and the vision device 2 may be operated in accordance with internally and/or externally created motion commands. The motion commands in this disclosure indicate general information including one or more commands, a signal, and/or an input for driving the locomobile robot. For example, the motion commands may include one or more information items for defining a linear movement or a rotation of the locomobile robot, such as information of a movement distance, a movement speed, a rotary angle, a rotation speed, or a movement destination.

When the driving unit 10 receives a motion command and drives the body 1 in accordance with the received motion command, the locomobile robot linearly moves and/or rotates. For example, the driving unit 10 may move the body 1 using information of a movement distance, a movement speed, or a destination designated by the motion command or may rotate the body 1 in accordance with a rotary angle or a rotation speed designated by the motion command.

In an embodiment, the system of controlling the vision device based on motion commands may include a motion command generating unit (not shown) that generates the above-described motion command. The motion command generating unit may constitute a part of the locomobile robot by being positioned at the body 1 of the locomobile robot. In this case, a motion command may be automatically created through an intelligent control of the locomobile robot. However, this is an example, and in another embodiment, the motion command generating unit may be positioned outside the locomobile robot and transmit a motion command to the locomobile robot through wired and/or wireless communication. For example, the motion command may be manually input by a user outside the locomobile robot and be transmitted to the locomobile robot.

In an embodiment shown in FIG. 2, the driving unit 10 has a shape of a wheel positioned at the lower portion of the body 1. However, this is an example, and the driving unit 10 may be configured as one or a plurality of different means for linearly moving or rotating the body 1 other than the wheel. Furthermore, the body 1 and the vision device 2 shown in FIG. 2 are also exemplarily visualized for convenience of description, and the size, the number, the shape, the connection method, and the like of each of the body 1 and the vision device 2 are not limited to the examples shown in the drawing.

The vision device 2 is a portion that is connected to the body 1 and receives image information. Referring to FIG. 2, the vision device 2 may include a driver 21 connected to the body 1 and a camera 22 connected to the driver 21. The driver 21 is a device suitable for carrying out a motion such as a linear movement or a rotation of the vision device 2. For example, the driver 21 may be a linear motion driver and/or a rotation motion driver. Furthermore, the driver 21 may include one or a plurality of driving shafts for moving the vision device 2 along the axial direction or rotating the vision device 2 about the axial direction. The camera 22 is a portion which receives image information of a recognition target 3. For example, the camera 22 may include a monocular camera, a stereo camera, or other appropriate image capturing means. The camera 22 may be attached to the surface of the vision device 2 or may be positioned by being inserted into the vision device 2 or integrated therewith.

Since the vision device 2 is directly or indirectly connected to the body 1, when the body 1 linearly moves or rotates, the position and/or the direction of the vision device 2 changes, so that the image information received by the camera 22 of the vision device 2 is influenced. Accordingly, in accordance with the motion of the body 1, the target 3 is deviated from the input range of the camera 22 or a phenomenon such as blurring may occur in the image information received by the camera 22 even when the target 3 is not deviated from the input range of the camera 22.

In order to prevent this, the first control unit 30 may adjust the direction of the line of sight of the vision device 2 so as to correspond to the motion of the body 1 estimated from the motion command. The first control unit 30 may calculate the movement direction and/or the rotation direction of the body 1 using the motion command, and may generate a first control signal $u_1$ for driving the vision device 2 so as to correspond to the movement and/or the rotation of the body 1. The first control unit 30 may control the position and the direction of the vision device 2 by controlling the driver 21 of the vision device 2 using the first control signal $u_1$. For example, the first control unit 30 may move and/or rotate the vision device 2 in a direction opposite to the movement direction and/or the rotation direction of the body 1. Furthermore, the movement distance and the rotation angle of the vision device 2 may be appropriately determined as a magnitude capable of compensating an influence in the image information due to the movement and the rotation of the body 1.

FIG. 3 is a plan view schematically illustrating a state where the direction of the line of sight of the vision device rotates so as to correspond to the motion of the body as a result of the operation of the first control unit. Referring to FIG. 3, the body 1 may linearly move in the direction depicted by the arrow in the drawing by the operation of the driving unit 10. Meanwhile, the recognition target 3 of the vision device 2 may be positioned at a direction rotated rightward by a predetermined angle θ with respect to the movement direction of the body 1. As the body 1 moves in the direction depicted by the arrow, the angle θ between the body 1 and the target 3 increases further.

At this time, the first control unit may calculate estimated motion information of the body 1 from the motion command for driving the body 1 and generate a control signal for driving the vision device 2 so as to adjust the direction of the line of sight for the compensation of the influence caused by the motion of the body 1. For example, as the body 1 moves along the direction depicted by the arrow, the first control unit may gradually rotate the direction of the line of sight of the vision device 2 rightward using the control signal. As a result, since the vision device 2 watches the target 3 at all times even when the body 1 travels, reliable image information of the target 3 may be obtained from the camera 22 included in the vision device 2.

In FIG. 3, an operation has been exemplarily described in which the body 1 linearly moves in one direction, but the first control unit may rotate the vision device 2 so as to correspond to the motion of the body 1 by calculating the angle θ formed between the body 1 and the target 3 on the basis of the motion information of the body 1 even when the body 1 arbitrarily travels through the linear movement and/or the rotation. Furthermore, in FIG. 3, an operation is exemplarily described in which the direction of the line of sight of the vision device 2 is rotated by the first control unit, but the first control unit may change the position of the vision device 2 so as to correspond to the motion of the body 1 by moving the vision device 2 in the direction of one or a plurality of driving shafts.

In order to carry out the control described above, the first control unit 30 may include a feedforward compensator that uses a motion command for driving the body 1 as a feedforward signal and generates a control signal so as to correspond to the motion of the body 1 estimated therefrom. In order to calculate motion information from a motion command, various estimation control technique including a rule-based method or a method using a Kalman filter may be adopted. Furthermore, the first control unit 30 may include various control circuits such as a P, PI, PD, or PID controller in order to realize such an estimation control technique. However, in embodiments of the invention, the configuration of the first control unit 30 is not limited to a specific control technique or a circuit configuration.

As described above, as a result of driving the vision device 2 in order to control the direction of the line of sight so as to correspond to the motion of the body 1 of the locomobile robot based on motion commands, the recognition target 3 may be positioned at the center of the image frame without being deviated from the image frame in the image information obtained from the vision device 2 regardless of the motion of the body 1. Accordingly, the vision device 2 may obtain reliable image information, and prevent a phenomenon such as blurring from occurring in the image information.

In an embodiment, the first control unit 30 may adjust the zoom of the camera 22 included in the vision device 2 in addition to the control of the movement and/or the rotation of the vision device 2. For this, the camera 22 may include a zoom adjusting device (not shown) which is driven in accordance with the control signal of the first control unit 30. As the zoom adjusting device, an optical adjusting device, an electronic zoom adjusting device, or other appropriate adjusting means may be adopted. As an example, the optical zoom adjusting device may adjust a magnification power of a subject by adjusting a focal distance while moving the combination of various lenses included in a lens unit of the camera 22. On the other hand, the electronic zoom adjusting device may enlarge or reduce the image information created by the camera 22 by processing a signal. The optical zoom adjusting device may be built in the camera 22. The electronic zoom adjusting device and a signal processing unit thereof may be built in the camera 22 or may be attached to the outside of the camera 22.

By adopting such a zoom adjusting device, the first control unit 30 may generate a control signal for controlling the zoom adjusting device of the camera 22 by using motion information of a subject estimated from a motion command and obtain image information with a desirable size with respect to a target by controlling the zoom adjusting device through the control signal. For example, when it is estimated that a distance between the body 1 and the recognition target increases as a result of analyzing the motion of the body 1 using the motion command, the first control unit 30 may increase the size of the image of the recognition target received by the camera 22 by increasing the zoom level of the camera 22. Further, in contrast, when it is estimated that a distance between the body 1 and the recognition target decreases, the first control unit 30 may decrease the size of the image of the recognition target received by the camera 22 by decreasing the zoom level of the camera 22.

Meanwhile, disturbance such as slip or collision may occur during the movement of the locomobile robot. In this case, there is a possibility that an error occurs between the actual motion of the body 1 and the motion of the body 1 estimated from the motion command. FIG. 4 is a schematic plan view illustrating an influence of slip or collision occurring during the movement of the locomobile robot.

Referring to FIG. 4, the movement path of the locomobile robot including the body 1 and the vision device 2 is depicted by arrows. The arrows 100, 110, 120, and 130 depicted by the solid line in the drawing indicate the movement path of the locomobile robot estimated from the motion command, and the arrows 200, 210, 220, and 230 depicted by the dotted line in the drawing indicate the actual movement path of the locomobile robot. As shown in the drawing, it is found that an error is present between the solid-line arrow 110 and the dotted-line arrow 210 and between the solid-line arrow 130 and the dotted-line arrow 230. This indicates that slip occurs in partial areas A and B when changing the direction of the locomobile robot.

In order to compensate such an error, the system of controlling the vision device based on motion commands according to an embodiment may include a detection unit 40 and a second control unit 50. The detection unit 40 is a device that measures disturbance occurring in the body 1 by detecting actual motion information of the body 1. The detection unit 40 may calculate motion information d including an occurrence state and a range of disturbance such as slip or collision occurring in the body 1 by comparing actual motion information detected by one or more sensors with motion information d of the body 1 based on a motion command received from the driving unit 10. For this, the detection unit 40 may include elements such as various sensors attached onto the body 1 or positioned inside the body 1. In an embodiment, the detection unit 40 may include one or more of an encoder, an inertial sensor, a distance sensor, a landmark device, an indoor Global Positioning System (iGPS) or other appropriate elements.

As an example, the detection unit 40 may include one or more encoders. In this case, the driving unit 10 may be movement means such as a wheel or a caterpillar which is driven by a rotation. In the case of using a plurality of driving units 10, an encoder may be attached to each driving unit 10, and each encoder may calculate motion information of the body 1 by measuring the number of rotations of the corresponding driving unit 10. For example, when the driving units 10 have the same number of rotations, this indicates that the body 1 linearly moves so as to move forward or backward in a linear direction. On the other hand, when the body 1 rotates, the driving units 10 connected to respective directions of the body 1 have different number of rotations due to the rotation. Accordingly, the rotation of the body 1 may be detected by comparing the number of rotations of the driving units 10. For example, in the plurality of driving units 10, when the number of rotations of the driving unit 10 positioned at the right side of the body 1 is relatively smaller than the number of rotations of the driving unit 10 positioned at the left side of the body 1, it is understood that the body 1 rotates rightward.

As another example, the detection unit 40 may include one or more inertial sensors. As the inertial sensor, an appropriate element capable of detecting one or a plurality of axial acceleration and angular velocity may be used. For example, the inertial sensor may include a three-axis acceleration sensor capable of detecting accelerations in three axial directions located in a space and a three-axis angular velocity sensor capable of detecting angular velocities in three axial directions. Furthermore, the inertial sensor may include one or more acceleration sensors detecting accelerations in different axial directions and one or more angular velocity sensors detecting angular velocities in different axial directions. The inertial sensor may measure acceleration generated by the movement of the body 1 and/or angular velocity generated by the rotation of the body 1, and calculate actual motion information of the body 1 from the measured acceleration and/or angular velocity.

As another example, the detection unit 40 may include one or more distance sensors. The distance sensor may be attached to the body 1, measure a distance with respect to a wall surface or a structure adjacent in each direction in a space within a movement range of the locomobile robot, and output the result in the form of the coordinates X and Y or the like. When the body 1 moves, the distance sensor may calculate motion information of the body 1 by comparing and analyzing the initial coordinates X and Y acquired before the movement of the body 1 and the coordinates X and Y after the movement of the body 1. Here, the position detecting method using the distance sensor is not limited to a specific type. Furthermore, as the distance sensor, an ultrasonic sensor, a laser sensor, an infrared (IR) sensor, or the like may be adopted.

When two distance sensors are used as the detection unit 40, each distance sensor may detect the coordinates X and Y before and after the movement of the body 1, and may detect the rotation in addition to the position movement of the body 1 on the basis of the coordinates X and Y detected by two distance sensors since a positional relation between two distance sensors is fixed. When the larger number of distance sensors are used as the detection unit 40, the three-dimensional motion of the body 1 may be detected, and the more accurate motion information of the body 1 may be obtained as the number of the distance sensors increases.

As another example, FIG. 5 illustrates a subject adopting the system of controlling the vision device based on motion commands using a landmark device as the detection unit 40. Referring to FIG. 5, a plurality of landmarks 600 is installed in a space within the movement range of the locomobile robot, and the detection unit 40 attached to the body 1 may include a vision sensor capable of recognizing the landmarks 600. Each landmark 600 needs to have a characteristic point or a characteristic amount which does not change over time so as to be recognized by the vision sensor of the detection unit 40, and may be positioned to any position in an indoor place including an indoor wall surface and a ceiling which may be detected by the detection unit 40. As the landmark 600, an artificial mark or a natural mark located in an indoor place may be adopted. Accordingly, a change in position and size of the landmark 600 may be extracted by recognizing the landmark 600 in the image information received by the vision sensor of the detection unit 40, and the movement, the rotation direction, the position coordinate, and the like of the body 1 may be calculated by using such a change. Here, a method of detecting a position of the body 1 and a method of analyzing an image signal are not limited to a specific type.

As another example, FIG. 6 illustrates a subject adopting the system of controlling the vision device based on motion commands using an iGPS device as the detection unit 40. Referring to FIG. 6, an iGPS signal transmitter 710 or an iGPS signal receiver 720 may be installed of which the coordinate values for installation within the movement range of the locomobile robot are set in advance. When the iGPS signal transmitter 710 is installed in a space, the detection unit 40 may be configured as an iGPS signal receiver. In contrast, when the iGPS signal receiver 720 is installed in a space, the detection unit 40 may be configured as an iGPS signal transmitter.

When the locomobile robot moves, the detection unit 40 may acquire distance information with respect to the signal transmitter 710 or the signal receiver 720 through a communication with the signal transmitter 710 or the signal receiver 720. Furthermore, position information of the body 1 to which the detection unit 40 is attached may be calculated through triangulation using a distance with respect to the plurality of signal transmitters 710 or signal receivers 720. Here, in order to acquire the rotation information of the body 1, two detection units 40 may be attached to the body 1. Since the distance between two detection units 40 attached to the body 1 is constant before and after the movement of the body 1, the rotation information of the body 1 may be obtained by analyzing a change in distance from one detection unit 40 to the signal receiver 720 or the signal transmitter 710.

In this regard, a method of detecting a position and a posture of the locomobile robot using the iGPS and a method of analyzing a signal is not limited to a specific type. Furthermore, the number and the arrangement position of each of the iGPS signal transmitter 710 and the iGPS signal receiver 720 is not limited to a specific configuration, and may be appropriately determined in consideration of the movement range, the movement path, and the like of the locomobile robot. For example, the signal transmitter 710 or the signal receiver 720 may be positioned at all places such as an indoor wall surface or a ceiling where the signal receiver or the signal transmitter of the detection unit 40 may receive a signal, and the type of a signal necessary for the communication in the iGPS is not limited to a specific type such as an radio frequency (RF), an IR, and a laser.

The motion information $\hat{d}$ representing disturbance calculated in the detection unit 40 may be transmitted to the second control unit 50. The second control unit 50 may generate a second signal $u_2$ for controlling a motion of the vision device 2 so as to compensate an influence caused by the disturbance by using the motion information calculated by the detection unit 40. In this case, the motion of the vision device 2 may be controlled by using the first control signal $u_1$ generated by the first control unit 30 and the second signal $u_2$ generated by the second control unit 50 as feedforward signals. Accordingly, the more accurate motion information may be calculated by compensating an error caused by disturbance such as slip or collision of the locomobile robot.

When a plurality of control signals such as the first control signal $u_1$ and the second signal $u_2$ is input to the vision device 2, the vision device 2 may be driven by a PID control type or a type such as a Fuzzy logic, a genetic algorithm, or a neural net. However, this is an example, and the control method of the vision device 2 of embodiments of the invention is not limited to a specific technique or a specific circuit.

Furthermore, in an embodiment, the second control unit 50 may not only control the movement and/or the rotation of the vision device 2, but also adjust the zoom level of the camera 22 included in the vision device 2. When it is analyzed that a distance between the body 1 and the recognition target 3 increases as a result of calculating the motion information $\hat{d}$ representing disturbance using the detection unit 40, the second control unit 50 may increase the size of the image of the recognition target 3 obtained by the camera 22 by increasing the zoom level of the camera 22. Furthermore, in contrast, when it is analyzed that a distance between the body 1 and the recognition target 3 decreases, the second control unit 50 may decrease the size of the image of the recognition target 3 obtained by the camera 22 by decreasing the zoom level of the camera 22.

In an embodiment, the system of controlling the vision device based on motion commands may further include an image processing unit 60 and a third control unit 70. By using the image processing unit 60 and the third control unit 70, the first and the second signals $u_1$ and $u_2$ generated by the first control unit 30 and/or the second control unit 50 may be used as feedforward signals as well as the image information received by the vision device 2 may be used as feedback signals so as to generate a third control signal $u_3$. Since a feedback control is performed so that the image information actually received by the vision device 2 is used as feedback signals, the motion of the vision device 2 is more accurately controlled, so that the reliability of the received image information may improve.

First, the image processing unit 60 may calculate a position of a predetermined target in the image information received by the vision device 2. For example, the predetermined target may be the recognition target 3 of the vision device 2, and various objects may be used as targets in accordance with the application of the vision device 2. In a process of calculating a target position by processing the image information using the image processing unit 60, various image processing techniques which are known or will be developed in the future may be used, and a method of processing image information of embodiments of the invention is not limited to specific image processing means or techniques. The image processing unit 60 may transmit a signal e corresponding to a difference between a target position and a reference position to the third control unit 70.

The third control unit 70 may generate the third control signal $u_3$ for controlling the motion of the vision device 2 on the basis of a difference between the target position and the reference position. The third control unit 70 may generate the third control signal $u_3$ so as to drive the vision device 2 in a direction in which a difference between the target position and the reference position decreases. For example, when the image information is a two-dimensional image, the coordinate of the reference position in the coordinate plane defined by the x and y axes is (0, 0), and the coordinate of the target position is (1, 1), the third control unit 70 may allows the target position to converge into the reference position by moving and/or rotating the vision device so that the aiming point of the line of sight of the vision device 2 is directed to the position (1, 1). As described above, the motion of the vision device 2 may be more accurately controlled by controlling the vision device 2 using the third control signal $u_3$ as a feedback signal together with the first control signal $u_1$ and the second signal $u_2$ as feedforward signals.

By adopting the above-described system of controlling the vision device based on motion commands, even when the locomobile robot linearly moves and/or rotates, the direction of the line of sight of the vision device of the locomobile robot may be maintained to be constantly directed to the recognition target. That is, the target may be made to be continuously positioned at the center of the output image frame of the vision device. In the embodiments described in this disclosure, an operation is described in which the vision device is moved and/or rotated in one direction when moving the locomobile robot, but this is an example. That is, the vision device may be moved in an arbitrary direction in a space including a longitudinal direction, a lateral direction, and a vertical direction, or the vision device may be rotated about the arbitrary direction in a space.

Furthermore, in the embodiments described above, a target tracking system is realized which drives the vision device portion of the locomobile robot so as to watch a specific recognition target, but this is an example. That is, the system of controlling the vision device based on motion commands according to the invention may be applied to stabilization and control for constantly maintaining the positions and/or the directions of the other portions of the locomobile robot. Furthermore, the disclosure may be applied to realize a tracking function of a vision device included in an arbitrary remote device controlled by a motion command or other appropriate devices in addition to the locomobile robot.

FIG. 7 is a flowchart illustrating a method of controlling a vision device based on motion commands according to an embodiment.

Referring to FIG. 7, first, the body of the locomobile robot may be driven in accordance with a motion command (S1). The motion command may include one or more information items for defining the linear movement or the rotation of the locomobile robot, such as a movement distance, a movement speed, a rotary angle, a rotation speed, or a destination of the locomobile robot. Such a motion command may be generated from the outside of the locomobile robot and be transmitted to the locomobile robot through wired and/or wireless communication or may be generated from the locomobile robot itself.

Then, the vision device may be driven so as to correspond to the motion of the body estimated by using the motion command (S2). Since the body and the vision device of the locomobile robot are directly or indirectly connected to each other, when the body linearly moves and/or rotates in accordance with the motion command, the position and/or the direction of the vision device changes due to the movement. Furthermore, the vision device includes a vision sensor (for example, a camera) for receiving image information of a recognition target, so that the image information received by the vision sensor is also influenced in accordance with the motion of the body.

In order to minimize such an influence, first, the motion information of the body may be calculated by using the motion command. For example, the motion information of the body may be calculated from the motion command by applying various estimation control techniques such as a rule-based method or a method using a Kalman filter. Then, the vision device may be driven so as to correspond to the motion of the body. For example, the vision device may be moved and/or rotated in a direction opposite to the movement direction and/or the rotation direction of the body. At this time, the movement range and/or the rotation range of the vision device may be appropriately determined to a degree capable of minimizing an influence on the image information received by the vision device when driving the body.

In an embodiment, in the step (S2) of driving the vision device, the movement and/or the rotation of the vision device may be controlled as well as the zoom level of the camera included in the vision device may be adjusted. In this case, the camera may include an optical zoom adjusting device, an electronic zoom adjusting device, or other appropriate adjusting means, and may adjust the zoom level of the camera by transmitting a control signal to the above-described adjusting means. When the zoom of the camera is adjusted in accordance with the motion of the body, the camera may accurately receive the image information of the target and the size of the target in the image information may be constantly maintained even when the body moves.

In an embodiment, the method may further include a step in which the detection unit attached to the body measures disturbance occurring in the body (S3). The detection unit may measure an occurrence state and a range of disturbance such as slip or collision occurring in the body by comparing the actual motion information detected by one or more sensors with the motion information of the body based on the motion command. For example, disturbance occurring in the body may be measured by using an element as a detection unit, where the element may be one or more sensors positioned inside the body or attached to the body, such as an encoder, an inertial sensor, a distance sensor, a landmark device, and an iGPS device.

Then, the vision device may be driven so as to correspond to the measured disturbance (S4). That is, the vision device may be driven so as to correspond to the motion of the body estimated from the motion command, and also the vision device may be driven so as to correspond to disturbance detected by a sensor element attached to the body. Accordingly, even when a difference occurs between the actual motion of the locomobile robot and the motion information obtained from the motion command due to disturbance such as slip or collision when the locomobile robot travels, an error caused by disturbance may be compensated by detecting disturbance using the detection unit.

In an embodiment, in the step (S4) of driving the vision device so as to correspond to the disturbance, the movement and/or the rotation of the vision device may be controlled as well as the zoom level of the camera included in the vision device may be adjusted. Since the specific configuration of adjusting the zoom level of the camera may be easily understood from the description of the step (S2), the specific description will not be repeated.

The vision device may receive the image information while controlling the motion of the vision device as described above (S5). As a result, since the vision device moves and rotates in a direction and by a degree corresponding to the motion of the body, an influence with respect to the image information of the vision device occurring due to the movement and the rotation of the body may be minimized. Accordingly, since the vision device may watch the target even when the locomobile robot moves, reliable image information may be obtained, and a phenomenon such as blurring may be prevented from occurring in the image even when the target is not deviated from the recognition range of the vision device.

In an embodiment, steps (S6 and S7) of controlling the vision device through a feedback control using the image information received by the vision device may be further included. First, a position of a predetermined target may be calculated in the image information received by the vision device (S6). The predetermined target may correspond to an image of a target to be recognized by the vision device. Then, the calculated target position may be compared with the predetermined reference position, and the vision device may be driven in accordance with the comparison result (S7). For example, the vision device may be driven in a movement direction and/or a rotation direction and by a degree in which a difference between the target position and the reference position decreases. The vision device may be more accurately controlled by carrying out a control using the image information received by the vision device as a feedback signal.

In this disclosure, the method of controlling the vision device based on motion commands according to embodiments has been described by referring to a flowchart proposed in the drawing. The above-described methods have been illustrated and described as a series of blocks for simple description, but the disclosure is not limited to the order of the blocks. That is, several blocks may be performed in accordance with an order different from that illustrated in the drawings or may be performed at the same time with other blocks. Various branches, stream paths, and procedures of blocks realizing the same or similar result may be realized. Furthermore, all blocks illustrated in the drawings may not be required to realize the methods described in this disclosure.

While the exemplary embodiments have been shown and described, it will be understood by those skilled in the art that various changes in form and details may be made thereto without departing from the spirit and scope of the present disclosure as defined by the appended claims. In addition, many modifications can be made to adapt a particular situation or material to the teachings of the present disclosure without departing from the essential scope thereof. Therefore, it is intended that the present disclosure will include all embodiments falling within the scope of the appended claims.

INDUSTRIAL APPLICABILITY

The present disclosure relates to a system and a method of controlling a vision device for tracking a target based on motion commands. Specifically, the disclosure relates to a system and a method of controlling a vision device based on motion commands capable of controlling a motion of a vision device so that a line of sight of the vision device attached to a locomobile robot is fixed to a recognition target using motion commands or motion commands and motion information detected by the locomobile robot.

The invention claimed is:

1. A system of controlling a line of sight of a vision device based on motion commands, the system comprising:
    a movable body;
    a driving unit which receives a motion command for driving the body;
    a vision device driven by being connected to the body, configured to be capable of changing the line of sight independently from the body, and receiving image information; a first control unit which receives the motion command used for driving the body, calculates an estimated motion information of the body using the received motion command used for driving the body, generates a control signal for rotating the vision device rightward or leftward and for moving the vision device to change the line of sight of the vision device so as to compensate for an estimated influence caused by the motion command on the body using the estimated motion information, and rotates the vision device rightward or leftward and moves the vision device to change the line of sight of the vision device to a direction different than a direction of the motion of the body using the control signal;
    an image processing unit which calculates a position of a predetermined target in the image information received by the vision device;
    a second control unit which moves and/or rotates the vision device in accordance with a comparison result between a predetermined reference position and the calculated position of the predetermined target calculated by the image processing unit;
    a detection unit attached to the body and measuring disturbance generated in the body; and
    a third control unit which moves and/or rotates the vision device so as to compensate an influence caused by the disturbance measured by the detection unit,
    wherein the motion command comprises information which defines a linear or angular motion of the body, the information comprising at least one of a movement distance, a rotary angle, and a destination,
    wherein the first control unit calculates an angle formed between the body and the predetermined target based on the estimated motion information and generates the control signal based on the calculated angle,
    wherein the control signal comprises a movement distance of the vision device,
    wherein the detection unit comprises at least one of an encoder, a distance sensor, a landmark device, and an indoor GPS device, and
    wherein the disturbance is an error between a movement path of the movable body and an actual movement path of the movable body.

2. The system of controlling the line of sight of the vision device based on motion commands according to claim 1, wherein the vision device comprises a driver connected to the body and a camera connected to the driver and receiving image information, and
    wherein the first control unit further adjusts a zoom level of the camera.

3. The system of controlling the line of sight of the vision device based on motion commands according to claim 1, wherein the vision device comprises a driver connected to the body and a camera connected to the driver and receiving image information, and wherein the third control unit further adjusts a zoom level of the camera.

4. A method of controlling the line of sight of a vision device based on motion commands, the method comprising:

providing a movable body;

providing a vision device driven by being connected to the body, configured to be capable of changing the line of sight independently from the body, and receiving image information;

receiving, in a first control unit, a motion command for driving the body, wherein the motion command comprises information which defines a linear or angular motion of the body and wherein the information comprises at least one of a movement distance, a rotary angle, and a destination;

calculating, by the first control unit, an estimated motion information of the body from the received motion command;

generating, in the first control unit, a control signal using the estimated motion information, wherein the control signal is for rotating the vision device rightward or leftward and for moving the vision device to change the line of sight of the vision device so as to compensate for an estimated influence caused by the motion command on the body;

rotating the vision device rightward or leftward and moving the vision device, under control of the first control unit, to change the line of sight of the vision device to a direction different than a direction of the motion of the body using the control signal;

calculating a position of a predetermined target by processing image information received by the vision device;

moving and/or rotating the vision device in accordance with a comparison result between a predetermined reference position and the calculated position of the predetermined target;

measuring disturbance generated in the body using at least one of an encoder, a distance sensor, a landmark device, and an indoor GPS device attached to the body; and moving and/or rotating the vision device so as to compensate an influence caused by the measured disturbance, wherein generating the control signal comprises:

calculating an angle formed between the body and the predetermined target based on the estimated motion information; and generating the control signal based on the calculated angle, wherein the control signal comprises a movement distance of the vision device, and wherein the disturbance is an error between a movement path of the movable body and an actual movement path of the movable body.

5. The method of controlling the line of sight of the vision device based on motion commands according to claim 4, wherein the vision device comprises a driver connected to the body and a camera connected to the driver and receiving image information, and further comprising adjusting a zoom level of the camera using the control signal.

6. The method of controlling the line of sight of the vision device based on motion commands according to claim 4, wherein the vision device comprises a driver connected to the body and a camera connected to the driver and receiving image information, and further comprising adjusting a zoom level of the camera using the measured disturbance.

7. The system of controlling the line of sight of the vision device based on motion commands according to claim 1, wherein the motion command which is transmitted to the driving unit is an input by a user outside the movable body.

8. The system of controlling the line of sight of the vision device based on motion commands according to claim 1, wherein the vision device is moved and/or rotated independently from the body using the control signal from the first control unit and another control signal from the second control unit in a control method based on any one of a PID control, a Fuzzy logic, a genetic algorithm, or a neural net.

9. The method of controlling the line of sight of the vision device based on motion commands according to claim 4, wherein the motion command is an input by a user outside the movable body, and wherein receiving the motion command comprises receiving the motion command via transmission.

10. The method of controlling the line of sight of the vision device based on motion commands according to claim 4, wherein moving and/or rotating the vision device so as to compensate the influence caused by the measured disturbance comprises:

generating another control signal using the measured disturbance; and changing the line of sight of the vision device using the control signal generated using the estimated motion information and the another control generated using the measured disturbance in a control method based on any one of a PID control, a Fuzzy logic, a genetic algorithm or a neural net.

* * * * *